(12) United States Patent
Igawa et al.

(10) Patent No.: US 10,571,327 B2
(45) Date of Patent: Feb. 25, 2020

(54) WATER LEVEL MEASURING DEVICE

(71) Applicant: TAIYO YUDEN CO., LTD., Tokyo (JP)

(72) Inventors: Izumi Igawa, Tokyo (JP); Ryuichi Sunagawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 204 days.

(21) Appl. No.: 15/684,698

(22) Filed: Aug. 23, 2017

(65) Prior Publication Data

US 2018/0058899 A1  Mar. 1, 2018

(30) Foreign Application Priority Data

Aug. 24, 2016 (JP) ................................. 2016-163358

(51) Int. Cl.
*G01F 23/284* (2006.01)

(52) U.S. Cl.
CPC .................................. *G01F 23/284* (2013.01)

(58) Field of Classification Search
None
See application file for complete search history.

(56) References Cited

U.S. PATENT DOCUMENTS

| 5,943,908 A * | 8/1999 | Innes ................... G01F 23/284 324/632 |
| 6,795,015 B2 * | 9/2004 | Edvardsson ......... G01F 23/284 342/118 |
| 7,739,905 B2 * | 6/2010 | Spetler .................. B60T 8/1725 152/209.18 |
| 2008/0303710 A1 * | 12/2008 | Kienzle ................. G01F 23/284 342/124 |
| 2009/0219192 A1 * | 9/2009 | Algra ..................... G01C 13/00 342/124 |
| 2018/0029937 A1 * | 2/2018 | Kondratowicz ....... C04B 28/006 |

FOREIGN PATENT DOCUMENTS

| JP | 2004-85564 A | 3/2004 |
| JP | 2004-325193 A | 11/2004 |

OTHER PUBLICATIONS

Japanese Office Action dated Oct. 2, 2019, in a counterpart Japanese patent application No. 2016-163358. (A machine translation (not reviewed for accuracy) attached.).

\* cited by examiner

*Primary Examiner* — Jill E Culler
(74) *Attorney, Agent, or Firm* — Chen Yoshimura LLP

(57) ABSTRACT

A water level measuring device for measuring a water level on a road surface includes a reflection member disposed in the road surface, the reflection member having a reflection surface that is parallel to the road surface, the reflection surface having a greater reflectance with respect to a probing radio wave than the road surface; an antenna unit transmitting the probing radio wave toward the reflection surface, the antenna unit also receiving a reflected wave of the probing radio wave that has been reflected from the reflection surface or water over the reflection surface; and a measuring unit connected to the antenna unit, the measuring unit processing the reflected wave received by the antenna unit to calculate and determine the water level on the road surface based on a return time of the reflected wave.

12 Claims, 5 Drawing Sheets

WATER LEVEL MEASURING DEVICE

BACKGROUND OF THE INVENTION

Technical Field

The present invention relates to a water level measuring device that uses radio waves in the millimeter wave band, for example.

Background Art

There are methods of using ultrasonic waves, laser, radio waves, or the like to measure the state of a paved road surface such as that of a sidewalk or road. Document 1, for example, discloses a road surface state detection system including a radio wave sensor transmitting radio waves toward a paved road surface and receiving reflected waves from a reflection surface, a controller calculating the distance from the radio wave sensor to the reflection surface and a reflection intensity of the reflected waves, and a determination unit determining whether the state of the paved road surface is dry, wet, submerged, or frozen based on the calculated distance to the reflection surface and the reflection intensity of the reflected waves.

RELATED ART DOCUMENT

Patent Document

Patent Document 1: Japanese Patent Application Laid-Open Publication No. 2004-325193

SUMMARY OF THE INVENTION

In the system disclosed in Patent Document 1, the state of the road surface is determined based on reflected radio waves from the road surface. However, when measuring the depth of submergence of the road surface, for example, the radio wave reflection characteristics for a dry road differ from that of a submerged road, and in general the radio wave reflection characteristics of a dry road surface are lower than the radio wave reflection characteristics of the water surface; thus, in the system disclosed in Patent Document 1, it is not possible to accurately measure changes in the water level of a dry road surface.

In consideration of the above, an aim of the present invention is to provide a water level measuring device capable of accurately measuring changes in the water level of a dry road surface. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a water level measuring device for measuring a water level on a road surface, including: a reflection member disposed in the road surface, the reflection member having a reflection surface that is parallel to the road surface, the reflection surface having a greater reflectance with respect to a probing radio wave than the road surface; an antenna unit transmitting the probing radio wave toward the reflection surface, the antenna unit also receiving a reflected wave of the probing radio wave that has been reflected from the reflection surface or water over the reflection surface; and a measuring unit connected to the antenna unit, the measuring unit processing the reflected wave received by the antenna unit to calculate and determine the water level on the road surface based on a return time of the reflected wave.

The water level measuring device includes a reflection member having a reflection surface that has greater radio wave reflection characteristics than the road surface. This ensures favorable reception sensitivity of reflection waves when the road surface is not submerged (such as when dry). Due to this, it is possible to accurately measure changes in the water level of a dry road surface.

The reflection member may have a dielectric constant that corresponds to a dielectric constant of water.

This makes it possible to have a radio wave reflection intensity that is equal to when the road surface is submerged, thereby enhancing measuring accuracy of changes in the water level of the road surface.

In the aforementioned configuration, as an example, the reflection member may be made of a ceramic composition having $(Ca_{1-x-y}Sr_xBa_y)_\alpha(Zr_{1-z}Ti_z)O_3$ perovskite as a main phase, and $SiO_2$ and $MnO$ as a minor phase, where $0<x<0.7$, $0<y<0.4$, $0\leq 1-x-y$, $0.15<z<0.4$, $0.99<\alpha<1.01$.

Furthermore, the reflection member may be a water storage body that is made of a material that is permeable to radio waves and that stores water therein.

As described above, the present invention makes it possible to accurately measure changes in the water level of a dry road surface. It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described below with reference to the drawings.

Figure 1:
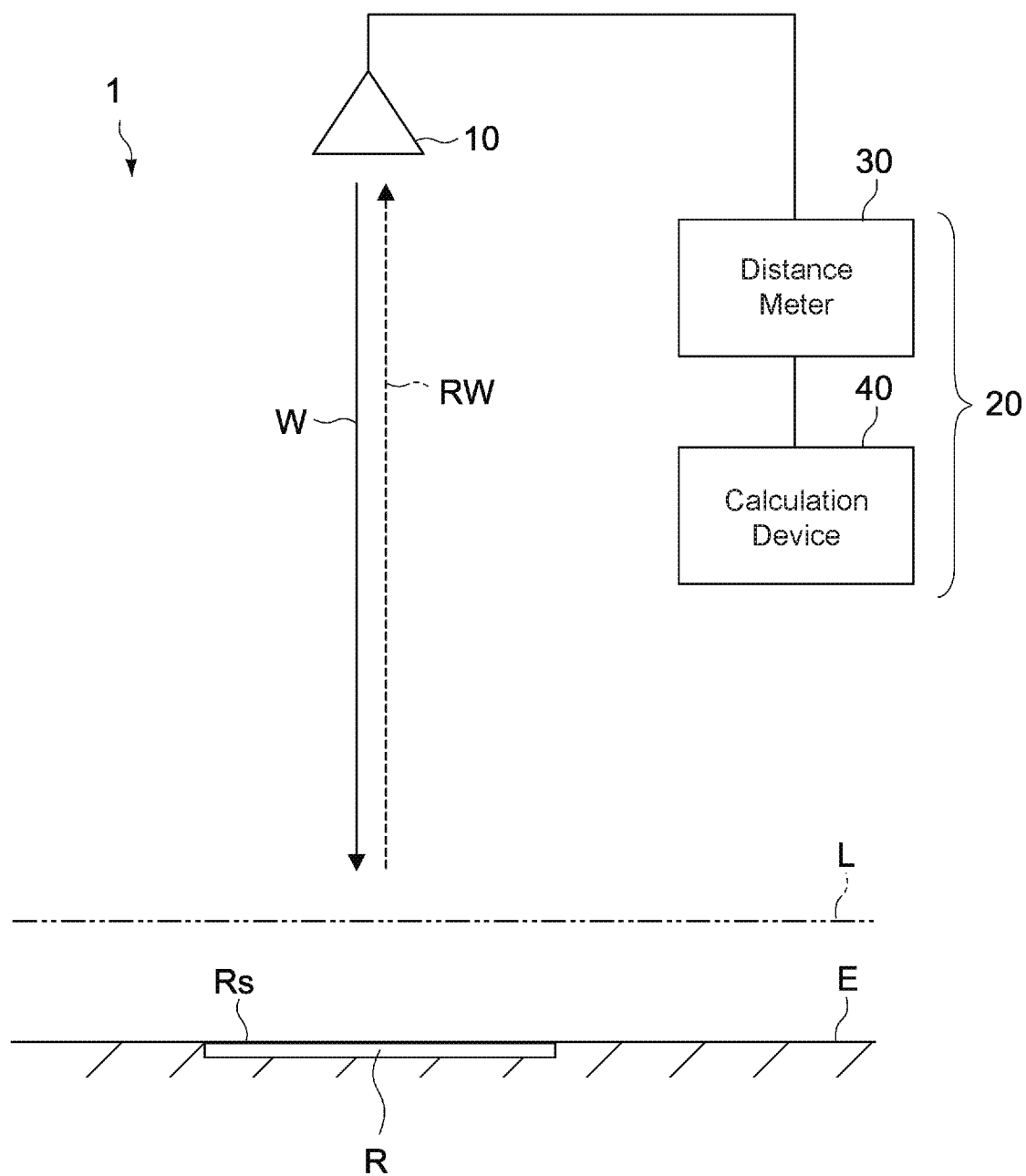
FIG. 1 is a schematic configuration diagram of a water level measuring device in one embodiment of the present invention.

FIG. 1 is a schematic configuration diagram of a water level measuring device in one embodiment of the present invention.

<Water Level Measuring Device>

The water level measuring device of the present embodiment is typically installed on a road or underpass area prone to being submerged during concentrated downpours or the like, and can perform unmanned measurement of whether submergence has occurred and of the depth of the submergence.

The water level measuring device 1 has a reflection member R, an antenna 10 (transceiver), and a measuring unit 20.

The reflection member R has a reflection surface Rs parallel to a road surface E. The reflection member R is typically installed on the road such that the reflection surface Rs has approximately the same height as the road surface E, but the reflection member is not limited to this and may be installed at a known height protruding slightly above the road surface E. There is no particular limitation on the location of the road surface E where the reflection member R is installed, but the reflection member is preferably installed in an area with little traffic, such as the shoulder of the road. Furthermore, the reflection member R is preferably installed on a flat surface, rather than on an inclined surface such as a slope.

The road surface E is paved and is typically asphalt, but may be concrete, brick, interlocking blocks, or other materials. The reflection surface Rs of the reflection member R is a material or structure with higher radio wave (radio waves for measuring water level such as millimeter waves or microwaves) reflection characteristics than the road surface E, and is typically made of metal, ceramic, or the like. There is no particular limitation to the shape and size of the reflection surface Rs, which is, for example, a rectangular plate where the length of one side is several dozen centimeters to several meters.

The antenna 10 emits (transmits) radio waves W used for measurement towards the reflection member R and can receive reflected waves RW of these radio waves from the reflection member R (reflection surface Rs). The antenna 10 of the present embodiment is a single transceiver installed directly above the reflector R and typically includes a single transmitter and a single receiver.

The radio waves W used for measurement are typically millimeter waves but are not limited to this; radio waves of other wavelengths (such as microwaves) that are capable of effectively reflecting off of the reflection surface Rs of the reflection member R and the surface of water may be used. There is no particular limitation to the height of the antenna 10 from the road surface E, and the height is set to two meters to five meters inclusive, for example.

The measuring unit 20 can determine if there is submergence and measure the depth (water level) of the submergence based on the reflected waves RW from the reflection member R (or the water surface L when the road surface E is submerged) received by the antenna 10. There is no particular limitation to the configuration of the measuring unit 20, which is configured as shown in FIG. 2, for example.

Figure 2:
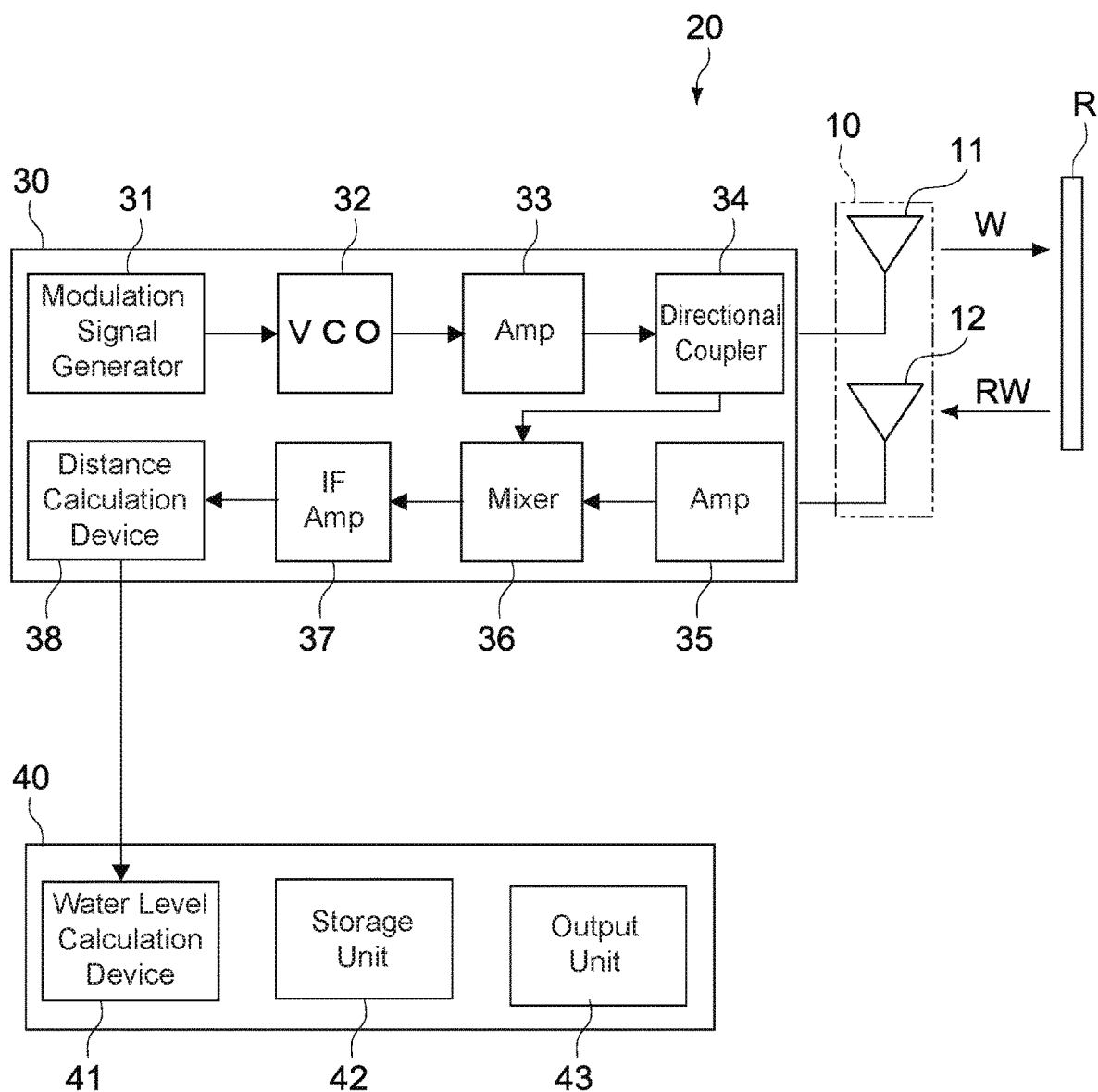
FIG. 2 is a block diagram showing one configuration example of a measuring unit in the water level measuring device.

FIG. 2 is a block diagram showing one configuration of the measuring device 20. The measuring device 20 includes a distance meter 30 and a calculation unit 40.

The distance meter 30 measures the electrical distance between the antenna 10 and the reflection member R or the water surface L based on the reflected waves RW received by the antenna 10. The distance meter 30 is typically a radio-wave distance meter (radar).

The distance meter 30 has a modulation signal generator 31, a VCO (voltage-controlled oscillator) 32, amps 33 and 35, a directional coupler 34, a mixer 36, an IF amp 37, and a distance calculation device 38.

The modulation signals from the modulation signal generator 31 are transmitted to the VCO 32, and high-frequency signals of a prescribed frequency (30 GHz, for example) band are output from the VCO 32. The high-frequency signals output from the VCO 32 are amplified to the necessary level for transmission output by the amp 33 and transmitted via the directional coupler 34 to the transmitter 11 of the antenna 10. This emits radio waves W used for measurement to the reflection member R, and the reflected waves RW of the radio waves are received by the receiver 12 of the antenna 10.

The amp 35 amplifies and transmits the reflected waves RW received by the receiver 12 to the mixer 36. The mixer 36 uses some of the transmission signals output from the coupling port of the directional coupler 34 to convert the frequency of the output signals of the amp 35, and then outputs IF signals. The IF signals are amplified by the IF amp 37 and transmitted to the distance calculation device 38. The distance calculation device 38 calculates the distance between the antenna 10 and the reflection location (reflection surface Rs or water surface L) of the radio waves W.

The calculation unit 40 has a water level calculation device 41, a storage unit 42, and an output unit 43. The calculation unit 40 is typically a computer.

Based on the calculation results of the distance calculation device 38, the water level calculation device 41 determines whether the road surface E is submerged and, if submerged, measures the height (water level) from the road surface E to the water surface L. The storage unit 43 stores calculation programs, various parameters, etc. that are necessary for the water level calculation device 41 to perform calculations. The parameters may include the height of the reflection member R, a table showing correlation between the return time of the reflected waves RW and distance, or the like.

The distance between the antenna 10 and the reflection member R is already known. Thus, the water level calculation device 41 uses the return time of the distance between the antenna 10 and reflection member B as a reference time, and when the return time of the radio wave is the same as the reference time, the water level calculation device determines that the water level is zero (no submerging), and when the return time of the radio wave is shorter than the reference time, determines that the difference in distance corresponding to the difference in the return time is the water level from the road surface. The value of the calculated water level corresponds to the depth of the submergence.

The output unit 43 outputs information relating to the water level as calculated by the water level calculation device 41. Examples of the output unit 43 include a communication unit that wirelessly or wiredly transmits to a display unit or external device.

The distance meter 30 and calculation unit 40 may be the same hardware or may be different hardware. If the latter, the distance meter 30 and calculation unit 40 are electrically connected by wires or wirelessly. In such a case, the calculation unit 40 can be installed in a location that is different from the location where the antenna 10, distance meter 30, etc. are installed.

Figure 3:
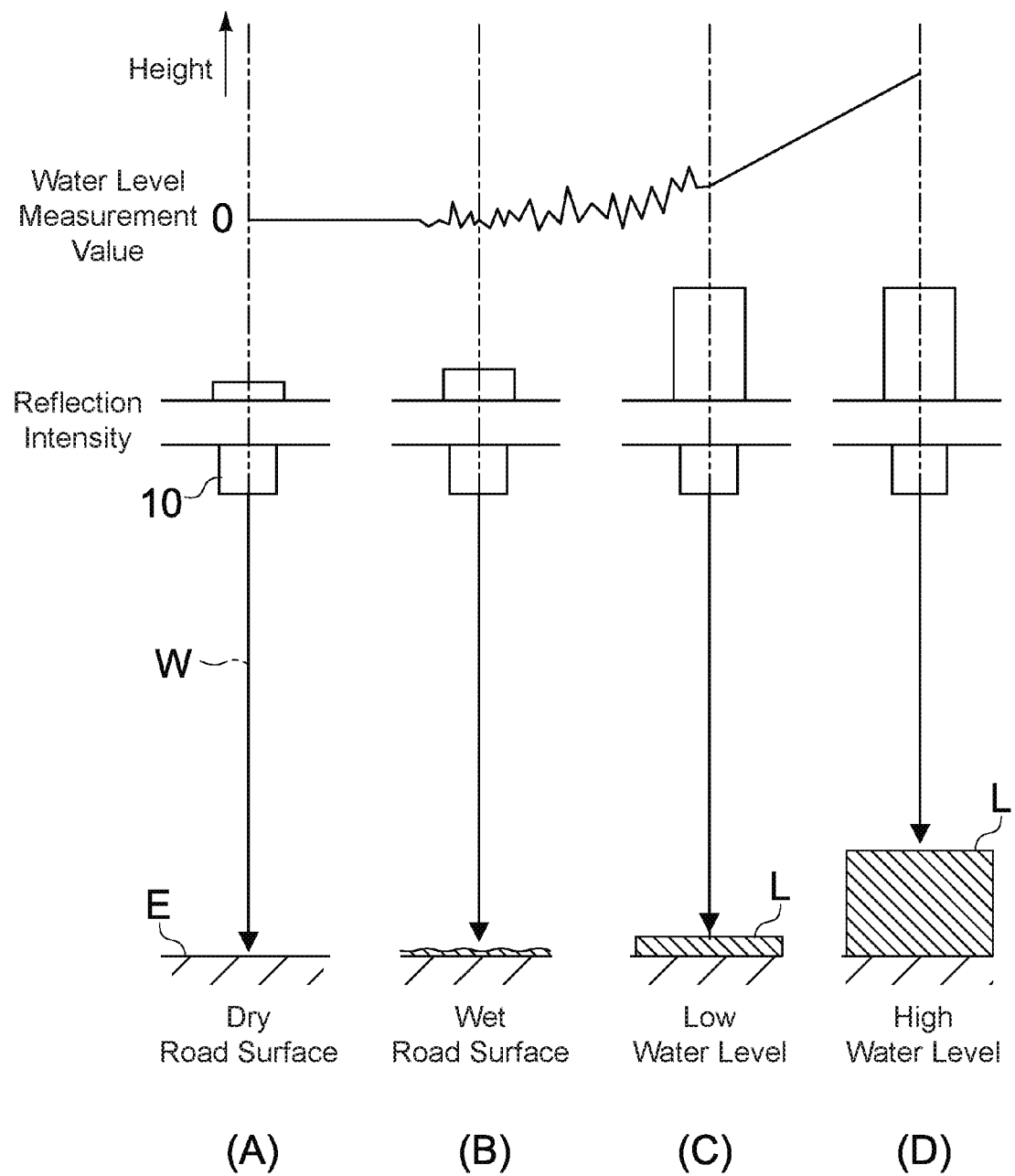
FIG. 3 is a schematic diagram showing one example of a water level measuring operation by the water level measuring device of a comparison example.
Figure 4:
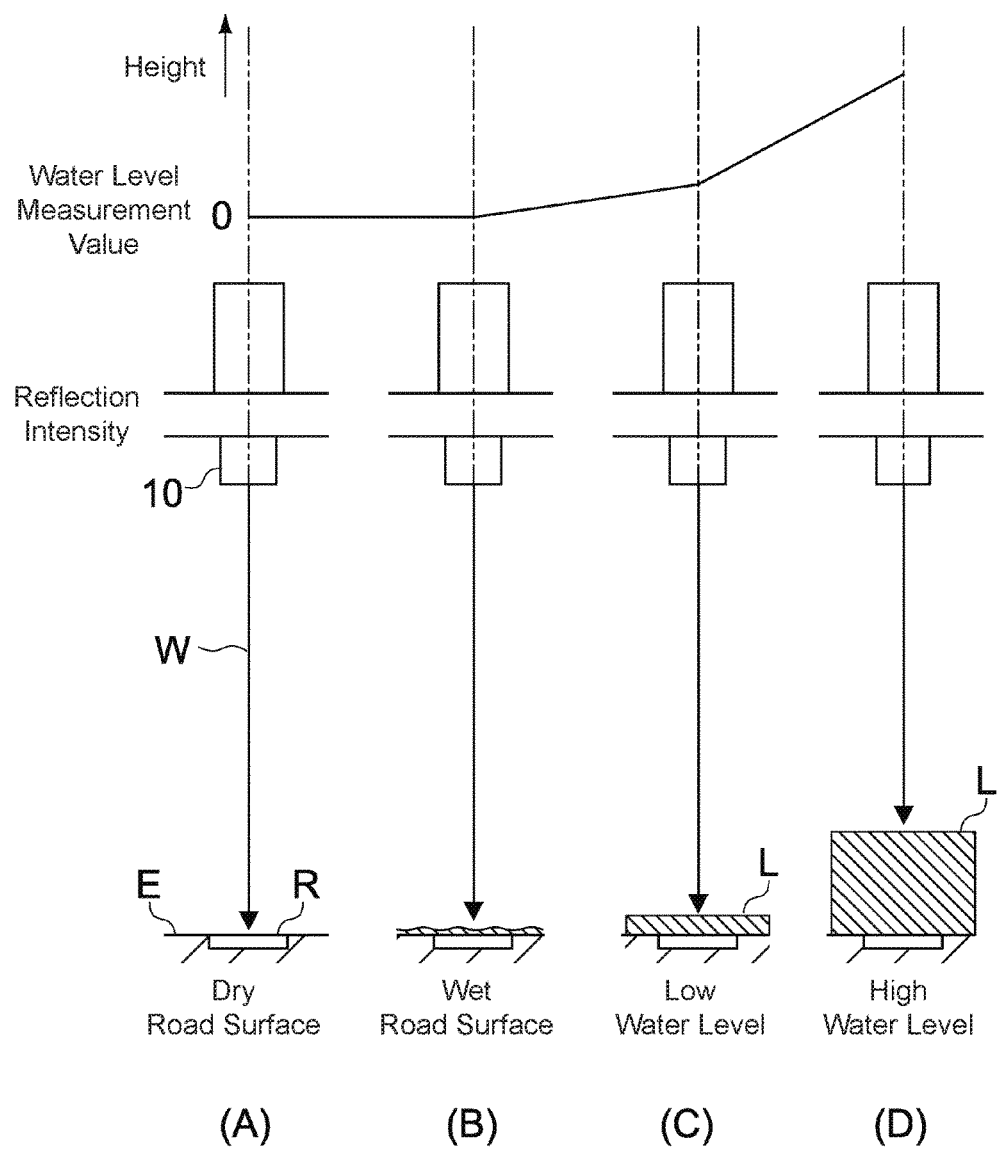
FIG. 4 is a schematic diagram showing one example of a water level measuring operation by the water level measuring device of the present embodiment.

FIG. 3 is a schematic diagram showing one example of a water level measuring operation by the water level measuring device of a comparison example, and FIG. 4 is a schematic diagram showing one example of a water level measuring operation by the water level measuring device of the present embodiment.

(Comparison Example)

The water level measuring device of the comparison example differs from the water level measuring device 1 of the present invention in not having the reflection member R. In the water level reflection device of the comparison example, the reflection intensity of the radio waves W from the road surface E is much less than the reflection intensity of the radio waves W from the water surface L, and thus it is necessary to change or increase the measuring range, or to determine that submerging has not occurred when at or below a prescribed reflection intensity. Thus, there is variation in the radio wave reflection intensities between the dry road surface and wet road surface, and it becomes very difficult to stably measure changes in the water level of the road surface E at or below a prescribed low water level.

(Present Embodiment)

On the other hand, the water level measuring device of the present embodiment includes the reflection member R, which has a reflection surface Rs with greater radio wave reflection characteristics than that of the road surface. This ensures favorable reception sensitivity of reflected waves when the road surface E is not submerged (such as when dry). Accordingly, there is less variation in radio wave reflection intensities between the dry road surface and wet road surface, and thus it is possible to stably measure changes in the water level of the road surface E even at or below a prescribed low water level. Due to this, the present invention makes is possible to accurately measure changes in the water level of the dry road surface.

<Reflection Member>

The reflection surface Rs of the reflection member R preferably has radio wave reflection characteristics that are equal to the rain water, river water, etc. submerging the road surface E. This makes the radio wave reflection intensity when the road surface E is dry and the radio wave reflection intensity when the road surface E is wet (or submerged) generally equal to each other (see FIG. 4), thus making it possible to detect changes in the water level with high accuracy.

In order to realize such reflection characteristics, in the present embodiment the reflection member R is a material having a dielectric constant that corresponds to the dielectric constant of water. A "dielectric constant that corresponds to the dielectric constant of water" means a dielectric constant that is the same as the dielectric constant of water (80) or approximately the same; specifically, the dielectric constant of the reflection member Rs is approximately 80±10.

An example of a material with a dielectric constant of around 80 is a ceramic composition of a prescribed composition. One example of this is a ceramic composition having perovskite with a basic formula of $(Ca_{1-x-y}Sr_xBa_y)_\alpha(Zr_{1-z}Ti_z)O_3$ as a main phase, and $SiO_2$ and MnO as a minor phase (where $0<x<0.7$, $0<y<0.4$, $0\leq 1-x-y$, $0.15<z<0.4$, $0.99<\alpha<1.01$).

This type of ceramic composition is fabricated by adding, with respect to 100 mol of the perovskite, 0.1 to 5.0 mol of SiO2, and 0.1 to 2.0 mol of MnO, for example.

Figure 5:
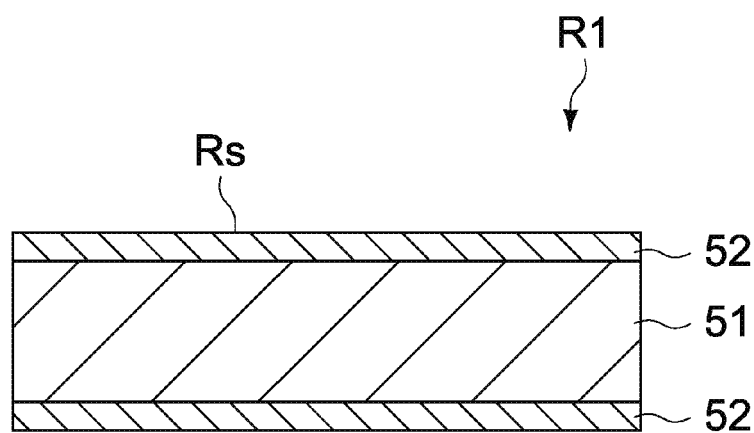
FIG. 5 is a schematic cross-sectional view showing one example of a configuration of a reflection member of the water level measuring device.

FIG. 5 is a schematic cross-sectional view of a reflection member R1 containing the aforementioned ceramic composition as a main body 51. The reflection member R1 may have protective plates 52 layered thereon for enhancing the rigidity of the main body 51. The protective plates 52 are made of a material that is permeable to radio waves W, and specifically, an acrylic-based resin such as ABS or PMMA, or an engineering plastic such as polycarbonate.

Figure 6:
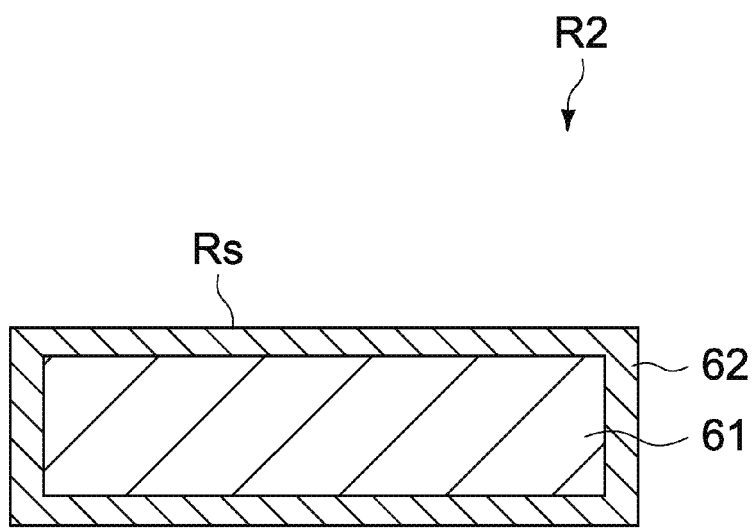
FIG. 6 is a schematic cross-sectional view showing another configuration example of the reflection member.

In addition to the aforementioned ceramic composition, a water storage body 62 filled with water 61 may be used as the reflection member R2, as shown in FIG. 6, for example. Similar to above, in such a case, the reflection surface Rs is made of a material that is permeable to radio waves, thereby making it possible to cause the water inside the storage body to function as a reflection body. The water 61 may be utility water, river water, rain water, or the like, or may be antifreeze to prevent freezing in the winter.

Embodiments of the present invention were described above, but the present invention is not limited to the above-mentioned embodiments, and various modifications can be made.

In the embodiments described above, the antenna 10 was a single unit having a transmitter 11 and a receiver 12, but the transmitter and receiver may be installed physically separated from each other in the air, for example. In such a case, the transmitter and receiver may each be installed at different heights.

Furthermore, in the embodiments described above, an example was described in which the present invention was applied to a system that measures the depth of submergence of a road, but the present invention is not limited to this and can be applied to various types of systems for measuring changes in the water level from a reference surface.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A water level measuring device for measuring a water level on a road surface, comprising:
   a reflection member disposed in the road surface, the reflection member having a reflection surface that is parallel to the road surface, the reflection surface having a greater reflectance with respect to a probing radio wave than the road surface;
   an antenna unit transmitting the probing radio wave toward the reflection surface, the antenna unit also receiving a reflected wave of the probing radio wave that has been reflected from the reflection surface or water over the reflection surface; and
   a measuring unit connected to the antenna unit, the measuring unit processing the reflected wave received by the antenna unit to calculate and determine the water level on the road surface based on a return time of the reflected wave,
   wherein the reflection member includes a first material having a dielectric constant that corresponds to a dielectric constant of water and a second material that is permeable to the probing radio wave on the first material so as to protect a top surface of the first material that functions as the reflective surface.

2. The water level measuring device according to claim 1, wherein the first material is made of a ceramic composition having $(Ca_{1-x-y}Sr_xBa_y)_\alpha(Zr_{1-z}Ti_z)O_3$ perovskite as a main phase, and $SiO_2$ and MnO as a minor phase, where $0<x<0.7$, $0<y<0.4$, $0<1-x-y$, $0.15<z<0.4$, $0.99<\alpha<1.01$.

3. The water level measuring device according to claim 2, wherein the antenna unit includes a transmitting antenna transmitting the probing radio wave toward the reflection surface and a receiving antenna receiving the reflected wave of the probing radio wave.

4. The water level measuring device according to claim 2, wherein the antenna unit is disposed above the reflection surface at a prescribed distance therefrom.

5. The water level measuring device according to claim 1, wherein the reflection member is a water storage body that is made of the second material and that stores water, as the first material, therein.

6. The water level measuring device according to claim 5, wherein the antenna unit includes a transmitting antenna transmitting the probing radio wave toward the reflection surface and a receiving antenna receiving the reflected wave of the probing radio wave.

7. The water level measuring device according to claim 5, wherein the antenna unit is disposed above the reflection surface at a prescribed distance therefrom.

8. The water level measuring device according to claim 1, wherein the antenna unit includes a transmitting antenna transmitting the probing radio wave toward the reflection surface and a receiving antenna receiving the reflected wave of the probing radio wave.

9. The water level measuring device according to claim 1, wherein the antenna unit is disposed above the reflection surface at a prescribed distance therefrom.

10. A water level measuring device for measuring a water level on a road surface, comprising:
   a reflection member disposed in the road surface, the reflection member having a reflection surface that is parallel to the road surface, the reflection surface having a greater reflectance with respect to a probing radio wave than the road surface;
   an antenna unit transmitting the probing radio wave toward the reflection surface, the antenna unit also receiving a reflected wave of the probing radio wave that has been reflected from the reflection surface or water over the reflection surface; and
   a measuring unit connected to the antenna unit, the measuring unit processing the reflected wave received by the antenna unit to calculate and determine the water level on the road surface based on a return time of the reflected wave,
   wherein the reflection member is a water storage body that is made of a material that is permeable to radio waves and that stores water therein.

11. The water level measuring device according to claim 10, wherein the antenna unit includes a transmitting antenna transmitting the probing radio wave toward the reflection surface and a receiving antenna receiving the reflected wave of the probing radio wave.

12. The water level measuring device according to claim 10, wherein the antenna unit is disposed above the reflection surface at a prescribed distance therefrom.

* * * * *